United States Patent
Xia et al.

(10) Patent No.: US 9,348,579 B2
(45) Date of Patent: May 24, 2016

(54) INTEGRATION OF SOCIAL NETWORKS WITH INTEGRATED DEVELOPMENT ENVIRONMENT (IDE)

(71) Applicants: Steven Qian Xia, Singapore (SG); Lin Cao, Singapore (SG); Yean Fee Ho, Singapore (SG)

(72) Inventors: Steven Qian Xia, Singapore (SG); Lin Cao, Singapore (SG); Yean Fee Ho, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/324,044

(22) Filed: Jul. 3, 2014

(65) Prior Publication Data

US 2016/0004529 A1    Jan. 7, 2016

(51) Int. Cl.
*G06F 9/44* (2006.01)
*G06F 9/445* (2006.01)

(52) U.S. Cl.
CPC *G06F 8/665* (2013.01); *G06F 8/67* (2013.01); *G06F 9/445* (2013.01)

(58) Field of Classification Search
None
See application file for complete search history.

(56) References Cited

U.S. PATENT DOCUMENTS

| | | | | |
|---|---|---|---|---|
| 7,949,617 B1 * | 5/2011 | Higgins | G06N 5/045 | 706/11 |
| 8,707,246 B2 * | 4/2014 | Chen | G06Q 10/101 | 717/101 |
| 9,213,760 B2 * | 12/2015 | Betz | G06F 17/30702 | |
| 2003/0192029 A1 * | 10/2003 | Hughes | G06F 8/20 | 717/101 |
| 2005/0005258 A1 * | 1/2005 | Bhogal | G06F 8/73 | 717/102 |
| 2005/0114475 A1 * | 5/2005 | Chang | G06Q 10/10 | 709/220 |
| 2006/0026251 A1 * | 2/2006 | Cheng | G06Q 10/10 | 709/207 |
| 2008/0134298 A1 * | 6/2008 | Nathan | G06F 8/20 | 726/4 |
| 2009/0006622 A1 * | 1/2009 | Doerr | G06Q 30/02 | 709/225 |
| 2009/0048927 A1 * | 2/2009 | Gross | G06F 17/30867 | 705/14.42 |
| 2009/0099895 A1 * | 4/2009 | Carrier | G06F 21/604 | 705/75 |
| 2010/0050154 A1 * | 2/2010 | Balasubramanian | G06F 8/33 | 717/113 |
| 2011/0202905 A1 * | 8/2011 | Mahajan | G06F 8/43 | 717/140 |
| 2012/0198414 A1 * | 8/2012 | Chen | G06Q 50/01 | 717/102 |
| 2014/0033171 A1 * | 1/2014 | Lorenz | G06F 8/34 | 717/121 |
| 2014/0068545 A1 * | 3/2014 | Lehmann | G06Q 10/103 | 717/101 |

(Continued)

OTHER PUBLICATIONS

James, "New Social API Web Application Toolkit for .NET web developer" [online], Jul. 2010, [retrieved from internet], [retrieved on Jul. 15, 2015], <www.jamessenior.com/2010/07/15/new-social-api-web-application-toolkit-for-net-web-developers-2/>.*

(Continued)

*Primary Examiner* — Isaac T Tecklu
(74) *Attorney, Agent, or Firm* — Horizon IP Pte. Ltd.

(57) ABSTRACT

Disclosed herein is a framework for integrating social networks with integrated development environment (IDE). In accordance with one aspect, the framework automatically downloads social information based on a user's workspace content. The downloaded social information may be filtered and further displayed. Software development may be performed using the displayed social information and updated social information may be stored in a database.

20 Claims, 7 Drawing Sheets

(56) References Cited

U.S. PATENT DOCUMENTS

| | | | | |
|---|---|---|---|---|
| 2014/0149856 A1* | 5/2014 | Fong | G06Q 50/01 | 715/254 |
| 2014/0173555 A1* | 6/2014 | Ng | G06F 8/30 | 717/109 |
| 2014/0201191 A1* | 7/2014 | Karmarkar | G06F 17/30554 | 707/722 |
| 2014/0222604 A1* | 8/2014 | Yellapragada | G06Q 50/01 | 705/26.1 |
| 2014/0282097 A1* | 9/2014 | Edlund | G06Q 10/103 | 715/753 |
| 2014/0359423 A1* | 12/2014 | Doan | G06F 17/2247 | 715/234 |
| 2015/0032651 A1* | 1/2015 | Tutterow | G06Q 50/20 | 705/319 |
| 2015/0134415 A1* | 5/2015 | Grossman | G06Q 30/0203 | 705/7.32 |
| 2015/0135160 A1* | 5/2015 | Gauvin | H04W 4/001 | 717/109 |
| 2016/0005001 A1* | 1/2016 | Muhammedali | G06Q 10/1053 | 705/319 |

OTHER PUBLICATIONS

Hani Ahmad Bani-Salameh "ASocial Collaborative Distributed Software Development Environment" 2010-2011, [retrieved from internet], [retrieved on Jul. 15, 2015], <www2.cs.uidaho.edu/~jeffery/cve/hbs_phd.pdf>.*

IBM Research, "Jazzing up Eclips with Collaborative Tools" [retrieved from internet], [retrieved on Jul. 15, 2015], <www.watson.ibm.com/cambridge/Thechnical/reports/2003/TR2003-12.pdf>.*

Li-Te Cheng et al., Building Collaboration into IDEs, http://www.ics.uci.edu/~andre/ics228s2006/chengdesouzahupferpattersonross.pdf, Dec./Jan. 2003-2004.

* cited by examiner

INTEGRATION OF SOCIAL NETWORKS WITH INTEGRATED DEVELOPMENT ENVIRONMENT (IDE)

TECHNICAL FIELD

The present disclosure relates generally to a method of integrating social networks with integrated development environment (IDE).

BACKGROUND

Software development is often a collaborative task of multiple developers. Collaboration in software development is not limited to dividing tasks among developers, but may also include sharing of ideas, discussing and consulting subject matters, and the like. Compared with a user who is working alone, some advantages of collaborative development include: 1) utilizing team knowledge and expertise, 2) easier and earlier detection of problems, 3) keeping up with the global insight of the project, 4) solving problems faster, 5) better design and more robust code, etc.

Social networks provide a communication and collaboration platform that mimics people's natural social environment. In such an environment, people may work together in the same structure and the social networks may be an ideal collaboration platform for software development as well.

In most applications with regard to integrated-collaborations of today, collaboration features are simple add-ons to the single-user features. In other words, the collaboration is divided into two parts i.e., 1) a single-user part that supports conventional single-user features, and 2) the collaborative part that allows the user to communicate with others. In this method, a single-user is not enhanced by the collaboration feature, which may create difficulties for users to communicate in such environment.

SUMMARY

Disclosed herein is a framework for integrating social networks with integrated development environment (IDE). In accordance with one aspect, the framework downloads social information based on a user's workspace content. The downloaded social information may be filtered and further displayed. Software development may be performed using the displayed social information and updated social information may be stored in a database.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A and 4B illustrate exemplary collaboration panes at a user interface (UI) side as described in the present implementations herein;

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Disclosed herein are technologies for integrating social networks with integrated development environment (IDE). Examples of users include individuals, business or corporate entities, etc. Technologies herein may be applied to computing and mobile applications.

Figure 1:
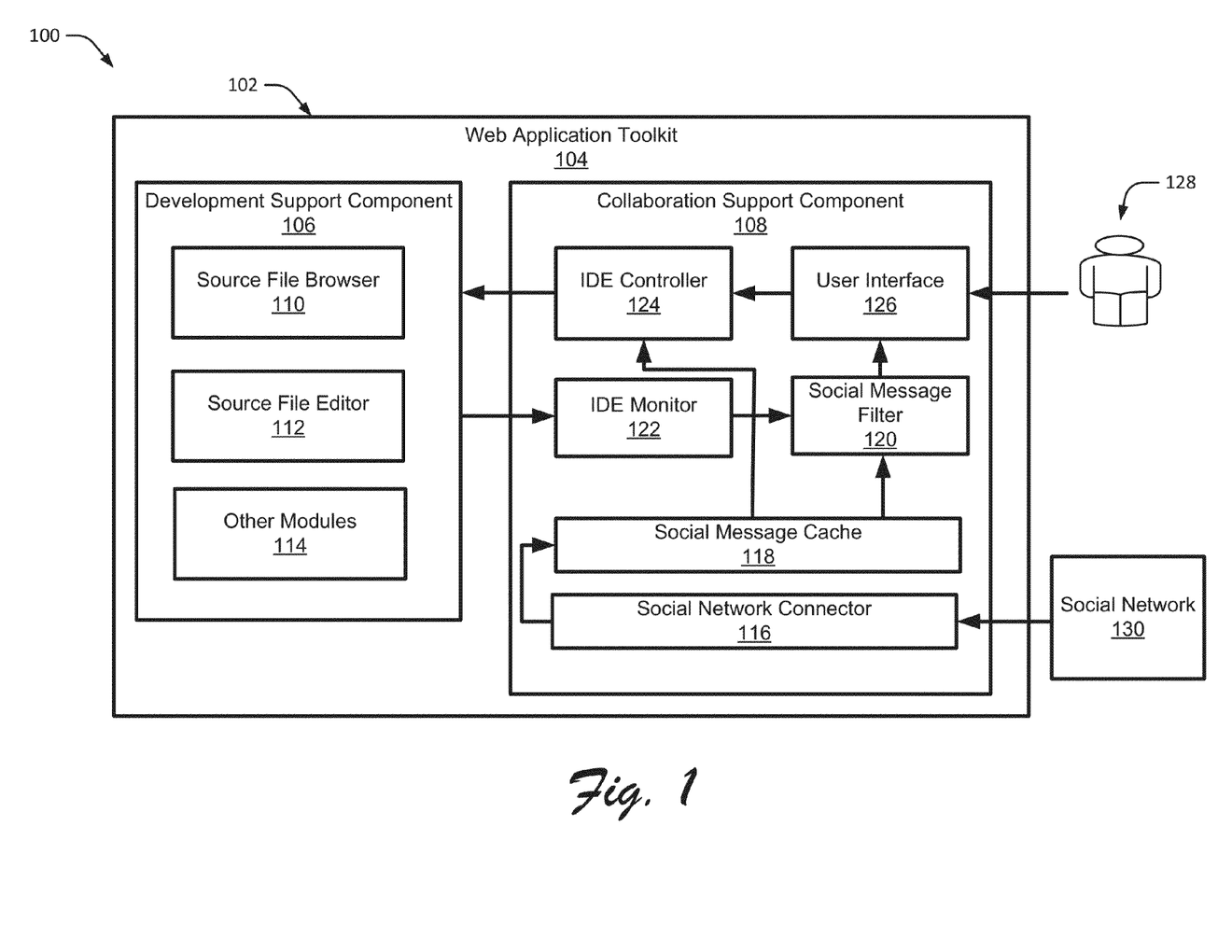
FIG. 1 illustrates an exemplary integrated development environment (IDE) system as described in the present implementations herein.

FIG. 1 shows an example integrated development environment (IDE) system 100 as described in the present implementations herein. As shown, the IDE system 100 includes a client 102 that may implement one or more software-based applications such as a Web Application Toolkit (WATT) 104. The WATT 104, as described herein, facilitates an integration of software development and social networking platform in the same workstation.

For example, the WATT 104 utilizes a development support component 106 and a collaboration support component 108 in implementing the integration between software development and the social networking platform. In this example, the development support component 106 includes a source file browser 110, a source file editor 112, and other modules 114. On the other hand, the collaboration support component 108 includes a social network connector 116, a social message cache 118, a social message filter 120, an IDE monitor 122, an IDE controller 124, and a user interface 126 that receives user-input from a user 128. The IDE system 100 further shows a social network 130 that includes social networking platform such as a SAP JAM, Facebook, Twitter, etc.

As an initial overview of the IDE system 100, the WATT 104 facilitates communication between developers (i.e., users 128) during software development, using the development support component 106 and the collaboration support component 108. For example, the collaboration support component 108 facilitates and supports a collaboration between the social network 130 and the development support component 106 within the same workstation or application (i.e., WATT 104). In this example, the user 128 may log in at the same time to WATT 104 and the social network 130, and the collaboration support component 108 facilitates integration between these two platforms so that the user 128 may not need to perform another action or use another application for collaboration purposes.

For example, the user 128 logs in at the client 102 to create or modify a particular (software) development project. In response to the user logging in, the social network connector 116 may automatically retrieve related social information such as names, discussions, questions, queries, messages, etc., from the social network 130.

In an implementation, the retrieved social information is loaded into social message cache 118. In this implementation, the loaded social information may be subsequently filtered by the social message filter 120 or the loaded social information is utilized by the IDE controller 124. For example, the social message filter 120 is configured to filter the loaded social information at the social message cache 118 before displaying the filtered social information at the user interface 126. In another example, the IDE controller 124 utilizes the loaded social message in the social message cache 118 to make changes in the development support component 106.

The development support component 106, by itself, is a fully functional IDE and as such, it may include traditional software development supporting capabilities as those of a typical IDE.

For example, the development support component 106 includes the source file browser 110, source file editor 112, and one or more modules 114 to provide software development supporting capabilities. In this example, the IDE monitor 122 monitors events and/or updates in the source file browser 110 and the source file editor 112 and based on these monitored events and/or updates, the IDE monitor 122 facilitates adjustment in the social message filter 120. For example, the social message filter 120 receives the adjustment and other information from the IDE monitor 122 and the social message filter 120 correspondingly make changes to the display at the user interface 126.

When the user 128 interacts with the user interface 126, the IDE controller 124 is configured to make corresponding changes to the development support component 106. For example, based on user-input topic revisions, user-questions, queries, etc., the IDE controller 124 configures corresponding changes to contents of source files in the source file browser 110. In another example, the IDE controller 124 integrates the loaded social information from the social message cache 118 to the user-inputs when performing the corresponding changes to the development support component 106.

In an implementation, the WATT 104 may be configured to save or retrieve data from the social network 130. Although the social network 130 may connect to the WATT 104 through a network (not shown), the collaboration support component 108 and development support component 106 may be located within the same system i.e., WATT 104. For example, in the case of Facebook as the social network 130, the user 128 may log in to the WATT 104 and also log in at the same time in Facebook through the use of the network. In another example, the SAP JAM networking tool may be integrated in the same system with the WATT 104. In the latter example, the user 128 may log in at the same time or even use the same user account and password to the WATT 104 and the SAP JAM.

Examples of the client 102 may include, but are not limited to, a mobile phone, a cellular phone, a smartphone, a personal digital assistant, a tablet computer, a netbook, a notebook computer, a laptop computer, a multimedia playback device, a digital music player, a digital video player, a navigational device, a digital camera, and the like.

Figure 2:
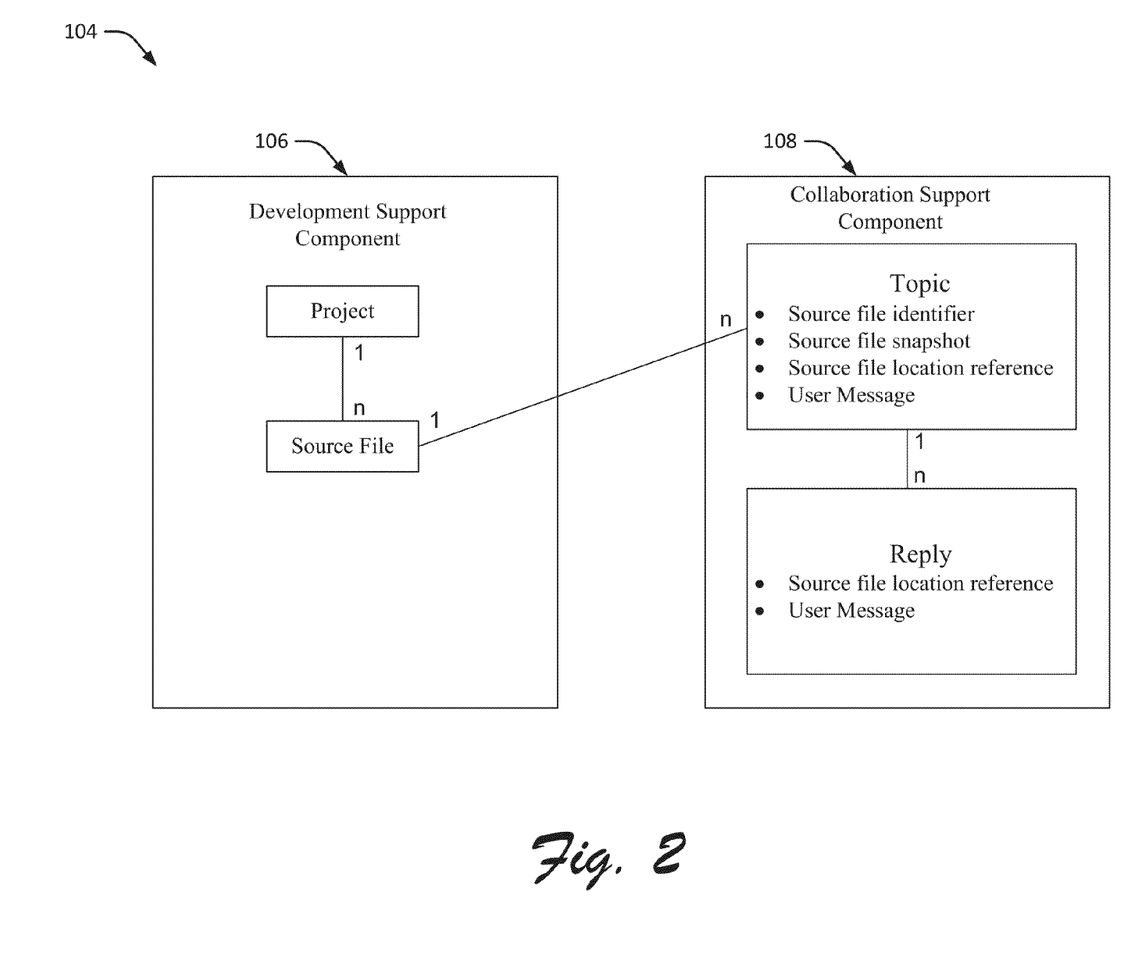
FIG. 2 illustrates exemplary key data structures in the IDE system as described in the present implementations herein.

FIG. 2 is an example illustration of key data structures in the WATT 104.

As mentioned above, the WATT 104 may save and retrieve data from the social network 130. In a typical IDE, the data is organized as projects at the development support component 106, and each of these projects may contain several source files. To this end, the source file browser 110 may be configured to search and load these several source files during software development while the source file editor 112 may be configured to facilitate changes based, for example, on the recommendations of the IDE controller 124. As discussed above, the IDE controller 124 may receive information through the user interface 126 and/or the social message cache 118.

At the collaboration support component 108, the user 128 may create a topic related to a particular source file. For example, the topic may include the following data entries: a) source file identifier that identifies the source file, which the topic is talking about; b) source file snapshot that includes a full copy of the source file created at the same time as the topic creation; c) source file location reference that includes line and column reference numbers to allow the user 128 to precisely refer to parts of the source file in a particular discussion; and d) user message that includes one or more messages from the user 128.

In an implementation, the architecture in FIG. 1 and the workflow of the data structure in FIG. 2 may enable the following functionality:

First, after the social network connector 116 retrieves related social information from the social network 130 (i.e., SAP JAM, Facebook, etc.), the IDE controller 124 receives the loaded social information from the social message cache 118. Based on the received social information, the IDE controller 124 may perform changes on contents of the source file browser 110. For example, the source files that are being discussed or the source files that are related to present topics, may be marked with a special icon. In this example, the WATT 104 integrates the social information into the traditional IDE user interface by helping the user 128 to quickly find the current topics or subject of discussion by clicking on the special icon(s).

Second, when the user 128, for example, activates and works on one or more source files in the source file editor 112, the IDE monitor 122 may detect this event. Based on this detection, the IDE monitor 122 facilitates adjustment in the social message filter 120 according to the associated source file identifier of the activated source file. As a result, topics related about the activated source file may be displayed in the user interface 126 for user's consumption. In other words, relevant collaboration information are available to the user 128 without any further action such as going out of the current workstation.

Third, when a topic or a reply in the user interface 126 is displayed for the user's consumption, the IDE controller 124 is aware or detects the information or contents in the displayed topic or reply and utilizes these information or contents for manipulation or processing. For example, the manipulation includes configuring the development support component 106 to display context information about the topic or reply in the following way: a) a snapshot of the source file editor is opened in the source file editor 112: and b) the subject portion of the opened source file according to source file location reference may be highlighted in a source code editor (not shown). The source code editor, for example, is a portion in a screen-display that shows current code of the source file.

Figure 3:
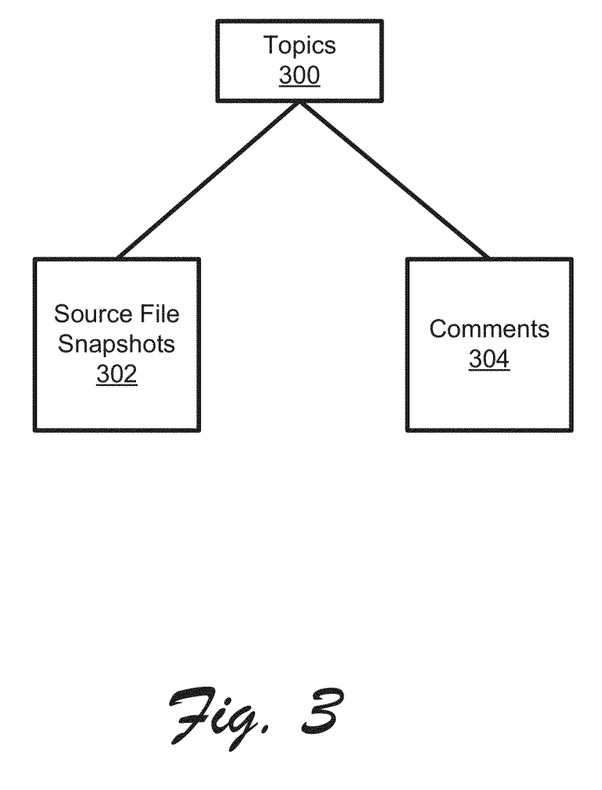
FIG. 3 illustrates an example data structure in a collaboration support component as described in the present implementations herein.

FIG. 3 shows an example illustration of data structure in the collaboration support component 108 as described in the present implementations herein.

The collaboration process or features as facilitated by the collaboration support component 108 may allow user-developers to discuss one or more topics that are related to source files. This collaboration process or feature is supported by the social network such as the SAP JAM platform, Facebook, Twitter, etc.

For example, the user 128 may raise or introduce topics 300 to be discussed. The introduced topics 300 may include a source file snapshot (i.e., source file snapshots 302). In this example, other user-developers may post their comments (i.e., comments 304) as well on the introduced topics 300.

In an implementation, the source file snapshots 302 may represent a status of the related source file when the topic is created. For example, source file snapshots 302 do not change regardless of subsequent revisions made on the same topic. As shown, the comments 304 (i.e., message from other users who read the topic) may be used to described the source file snapshots 302 in a discussion context during the process of software development.

Figure 4B:
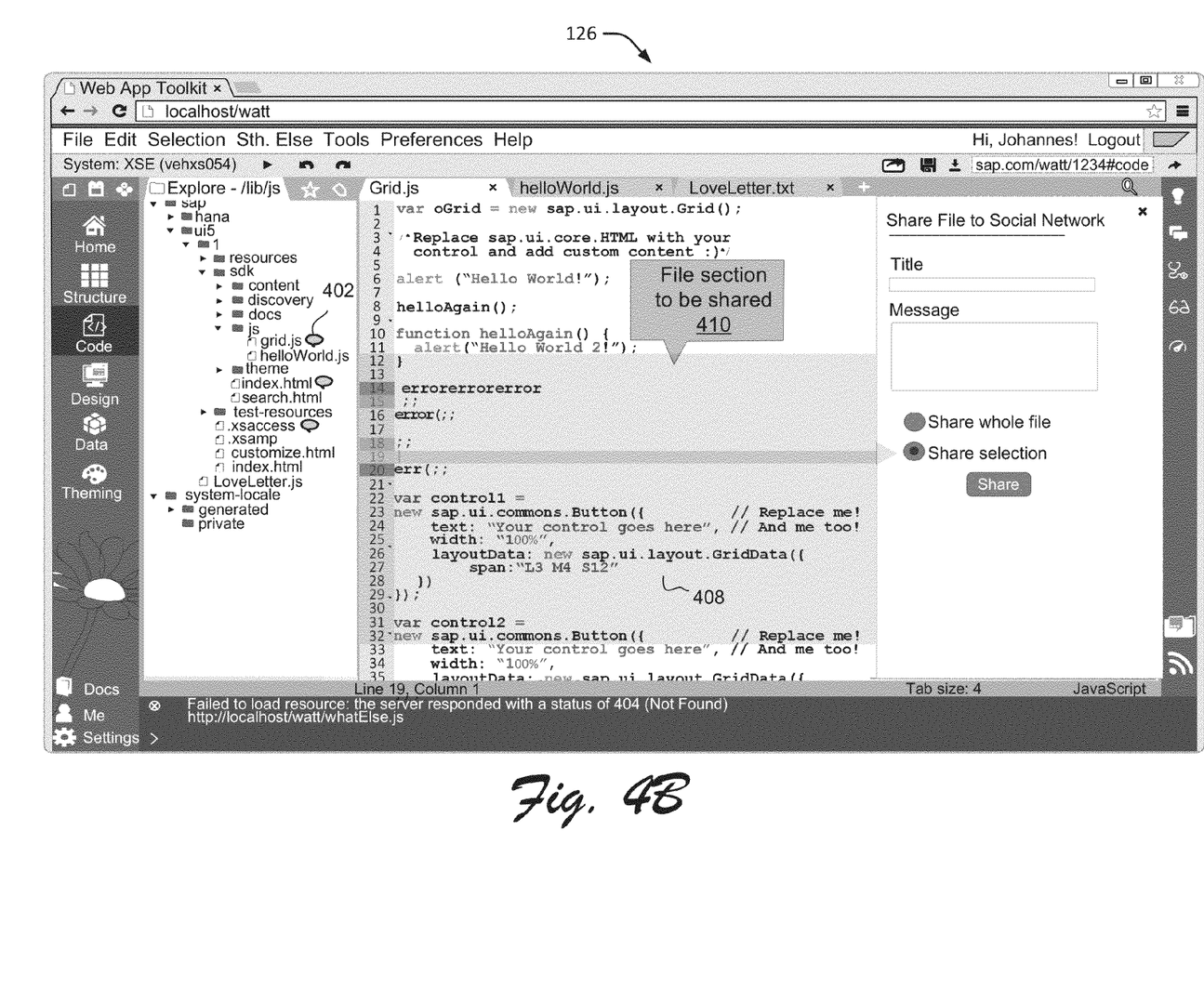

FIGS. 4A and 4B show exemplary collaboration panes at the user-interface (UI) as described in the present implementations herein.

In an implementation, FIG. 4A shows an example collaboration pane that displays the integration between an IDE and the social networks (e.g., SAP JAM) in the IDE system 100. For example, the user logs in to the WATT 104 and the social network 130, and the collaboration support component 108 may automatically download social information, related topics, related-contents, etc., from the social network 130. In this example, the user-interface 126 utilizes a project tree 400, a shared-file icon 402, a share-button 404, a discussion panel 406 and a code editor 408 to display the filtered social information, and other changes that may be supplied or facilitated by the IDE monitor 122 as discussed above.

For example, when a first user 128 enters a message or question on a created topic, the entered message or question may be posted at the discussion panel 406. In this example, the collaboration support component 108 may be configured to take the snapshot (e.g., source file snapshots 302) of the related source file and this snapshot is saved by the WATT 104 in the social network 130. In this manner, when a second user 128 opens the same source file, the posted message or question may be downloaded and shown at the discussion panel 406 while the corresponding source file snapshots 302 may be downloaded as well and shown at the code editor 408.

In another example, the collaboration pane and particularly the code editor 408 may show the codes or contents for the current topic. The user 128 may highlight the contents of current discussion or the user 128 may perform revisions on the current contents of the code editor 408.

In another example still, the user 128 may find a list of topics from the project tree 400. In the project tree 400, the source files that have been a subject of discussion by different users may be marked with an icon 402. For example, folders that contain such source files are marked with the same icon. In this example, the marking may help the user 128 in finding discussed files from a large collection of source files. As discussed above, topic discussions for each project may be saved or mapped by the WATT 104 to the integrated social network 130.

With continuing reference to FIG. 4B, the user 128 may highlight a relevant portion of the code that is currently a topic of discussion by the user with another user or software developer. For example, the user interface 126 shows a highlighted portion 410 at the code editor 408 to illustrate an emphasized portion of the file shared by the user. In this example, the shared-file icon 402 may indicate this file together with the highlighted portions when the shared file is opened by the other user or software developer.

Figure 5:
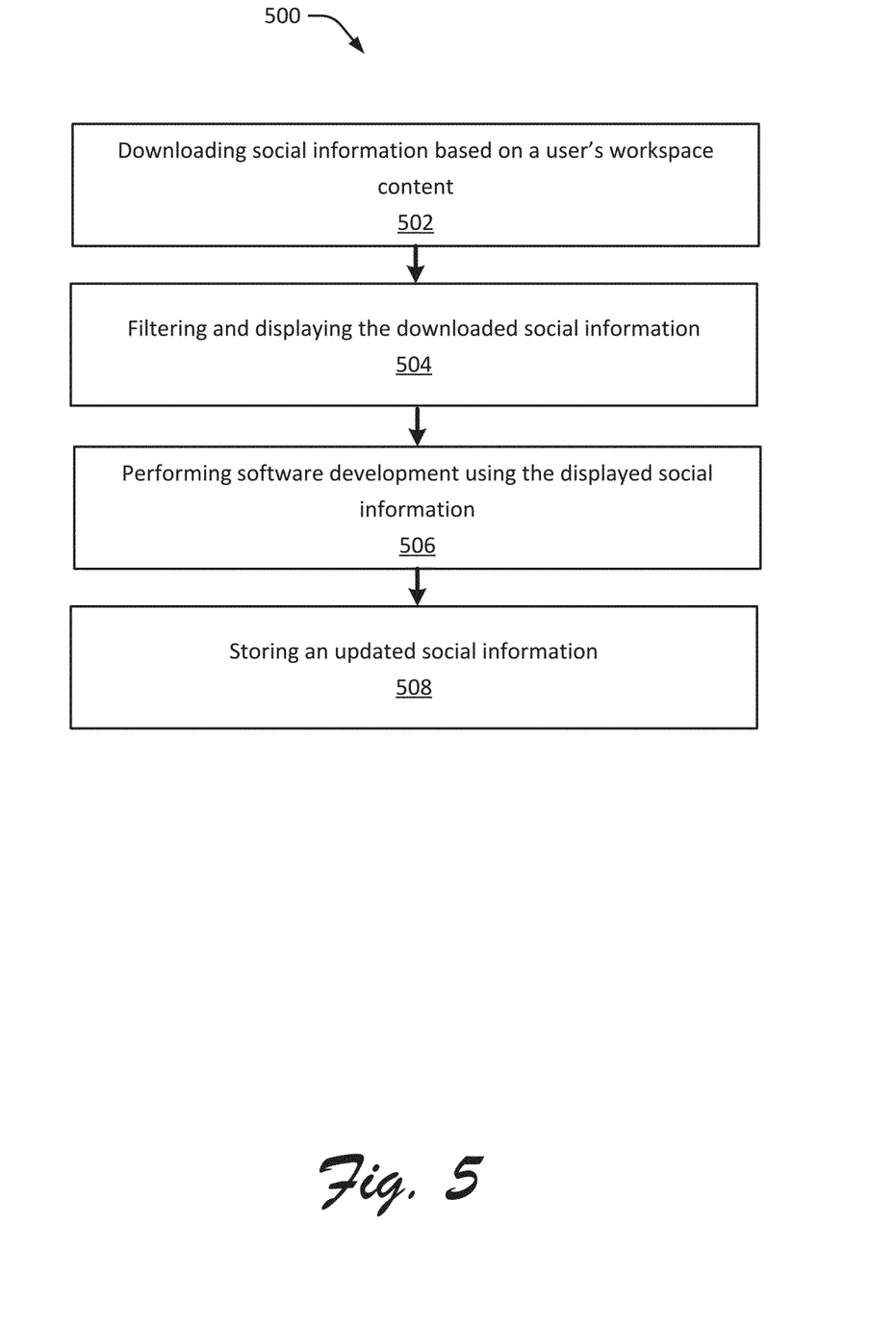
FIG. 5 illustrates an exemplary process for implementing, at least in part, the technology described herein.

FIG. 5 illustrates an exemplary process 500 for implementing, at least in part, the technology described herein. In particular, process 500 depicts a flow to implement a method of IDE that supports software development and social network collaboration in a single-space workstation. The process 500 may be performed by a computing device or devices. An example architecture of such a computer device is described below with reference to FIG. 6. In this particular example, the process 500 describes that certain acts are to be performed at or by a user or a system.

At 502, downloading social information based on user's workspace content is performed. For example, the social network connector 116 automatically downloads related topics, social information, and related-contents from the social network 130 when the user logs in to the WATT 104 and the social network 130.

At 504, filtering and displaying the downloaded social information is performed. In an implementation, the downloaded social information are loaded into social message cache 118. In this implementation, the loaded social information may be subsequently filtered by the social message filter 120 or the loaded social information is utilized by the IDE controller 124. For example, the social message filter 120 is configured to filter the loaded social information at the social message cache 118 before displaying the filtered social information at the user interface 126. In another example, the IDE controller 124 utilizes the loaded social message in the social message cache 118 to make changes in the development support component 106.

At 506, performing software development using the displayed social information is performed. For example, the software development is enhanced by the displayed social information. In this example, the user-developer may utilize the displayed social information without having to perform another action or transfer to another application to avail the collaboration feature as described in implementations herein. In other words, the user 128 may perform collaboration or communicate with other user-developers within the same user-workstation.

At 508, storing an updated social information is performed. During the process of working on the development project by the user, the WATT 104 continuously updates its database with regard to any structure changes in the topics, groups, comments, snapshots, etc., in the particular development project. The database may be located in the social network 130 or in the case of SAP JAM, the database may be located on the WATT itself.

Figure 6:
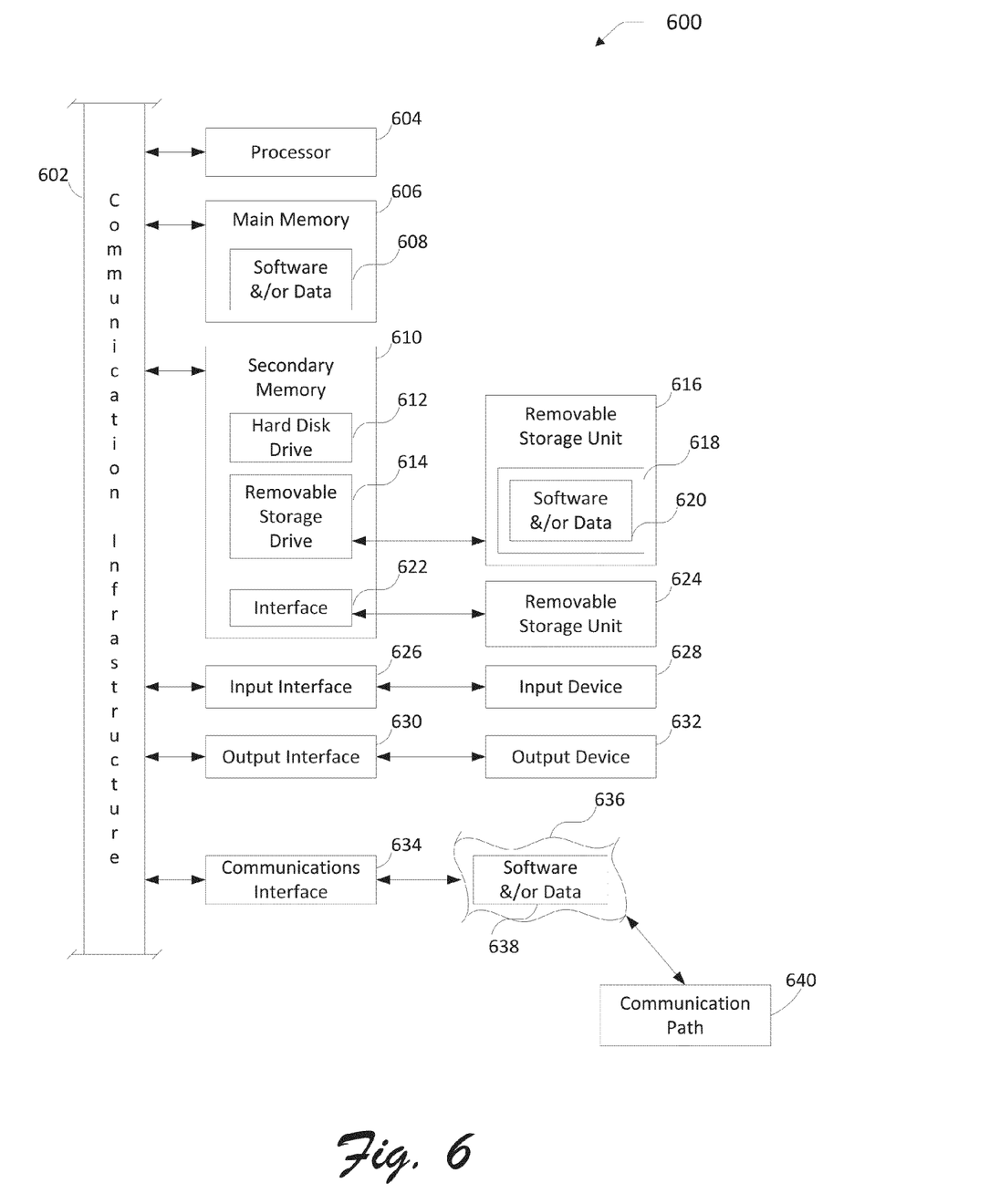
FIG. 6 illustrates an exemplary computing system to implement in accordance with the technologies described herein.

FIG. 6 illustrates an exemplary system 600 that may implement, at least in part, the technologies described herein. The computer system 600 includes one or more processors, such as processor 604. Processor 604 can be a special-purpose processor or a general-purpose processor. Processor 604 is connected to a communication infrastructure 602 (for example, a bus or a network). Depending upon the context, the computer system 600 may also be called a client device.

Computer system 600 also includes a main memory 606, preferably Random Access Memory (RAM), containing possibly inter alia computer software and/or data 608.

Computer system 600 may also include a secondary memory 610. Secondary memory 610 may include, for example, a hard disk drive 612, a removable storage drive 614, a memory stick, etc. A removable storage drive 614 may comprise a floppy disk drive, a magnetic tape drive, an optical disk drive, a flash memory, or the like. A removable storage drive 614 reads from and/or writes to a removable storage unit 616 in a well-known manner. A removable storage unit 616 may comprise a floppy disk, a magnetic tape, an optical disk, etc., which is read by and written to by removable storage drive 614. As will be appreciated by persons skilled in the relevant art(s) removable storage unit 616 includes a computer usable storage medium 618 having stored therein possibly inter alia computer software and/or data 620.

In alternative implementations, secondary memory 610 may include other similar means for allowing computer programs or other instructions to be loaded into computer system 600. Such means may include, for example, a removable storage unit 624 and an interface 622. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 624 and interfaces 622 which allow software and data to be transferred from the removable storage unit 624 to computer system 600.

Computer system 600 may also include an input interface 626 and a range of input devices 628 such as, possibly inter alia, a keyboard, a mouse, etc.

Computer system 600 may also include an output interface 630 and a range of output devices 632 such as, possibly inter alia, a display, one or more speakers, etc.

Computer system 600 may also include a communications interface 634. Communications interface 634 allows software and/or data 638 to be transferred between computer system 600 and external devices. Communications interface 634 may include a modem, a network interface (such as an Ethernet card), a communications port, a Personal Computer Memory Card International Association (PCMCIA) slot and card, or the like. Software and/or data 638 transferred via communications interface 634 are in the form of signals 636 which may be electronic, electromagnetic, optical, or other signals capable of being received by communications interface 634. These signals 636 are provided to communications interface 634 via a communications path 640. Communications path 640 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to media such as removable storage unit 616, removable storage unit 624, and a hard disk installed in hard disk drive 612. Computer program medium and computer usable medium can also refer to memories, such as main memory 606 and secondary memory 610, which can be memory semiconductors (e.g. Dynamic Random Access Memory (DRAM) elements, etc.). These computer program products are means for providing software to computer system 600.

Computer programs (also called computer control logic) are stored in main memory 606 and/or secondary memory 610. Such computer programs, when executed, enable computer system 600 to implement the present technology described herein. In particular, the computer programs, when executed, enable processor 604 to implement the processes of aspects of the above. Accordingly, such computer programs represent controllers of the computer system 600. Where the technology described herein is implemented, at least in part, using software, the software may be stored in a computer program product and loaded into computer system 600 using removable storage drive 614, interface 622, hard disk drive 612 or communications interface 634.

The technology described herein may be implemented as computer program products comprising software stored on any computer useable medium. Such software, when executed in one or more data processing devices, causes data processing device(s) to operate as described herein. Embodiments of the technology described herein may employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more embodiments described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

What is claimed is:

1. A method of integrating social networks with integrated development environment (IDE), the method comprising:
    downloading social information;
    filtering and displaying the downloaded social information;
    performing software development using the displayed social information, wherein the performing software development comprises creating a topic related to a source file, wherein the topic comprises an identifier that identifies the source file, a location reference of the source file, one or more user comments and a source file snapshot that includes a read-only copy of the source file; and
    storing updated social information in a database, wherein the updated social information comprises the created topic.

2. The method according to claim 1, wherein the downloading the social information is based on a user's workspace content.

3. The method according to claim 1, wherein the downloading is implemented through a collaboration support component of a software-based Web Application Toolkit (WATT), wherein the social information is downloaded from a social network.

4. The method according to claim 3, wherein the collaboration support component is integrated into a development support component to form the software-based Web Application Toolkit.

5. The method according to claim 3, wherein the downloaded social information is utilized by the collaboration support component to facilitate changes in a development support component of the software-based Web Application Toolkit.

6. The method according to claim 1, wherein the social information is attached and displayed through an icon in a user interface.

7. The method according to claim 1, further comprises downloading and displaying the source file snapshot in response to opening the source file.

8. The method according to claim 1, wherein the performing the software development comprises marking, with an icon, the source file in a project tree of source files to indicate it has been a subject of discussion.

9. The method according to claim 1, wherein the displaying of the downloaded social information comprises displaying of source file reference in a user interface.

10. The method according to claim 9, wherein the displaying comprises showing a project tree, a shared file icon, a discussion panel, a share button, and a code editor.

11. A device comprising:
    non-transitory computer-readable media for storing processor-executable instructions; and
    a processor communicatively coupled to the computer-readable media, the processor being operative with the processor-executable instructions to perform operations comprising:
        downloading social information,
        filtering the downloaded social information,
        performing software development using the downloaded social information, wherein the software development comprises creating a topic related to a source file, wherein the topic comprises an identifier that identifies the source file, a location reference of the source file, one or more user comments and a source file snapshot that includes a read-only copy of the source file, and
        storing updated social information including the created topic.

12. The device according to claim 11 further comprising a social network connector and a social message filter, wherein both are components of a collaboration support component that facilitates integration between a social network and a development support component within a same workstation.

13. The device according to claim 12, wherein the collaboration support component is integrated to the development support component to form a software-based Web Application Toolkit (WATT).

14. The device according to claim 11 further comprising a user interface that displays a collaboration pane, which includes a project tree, a shared file icon, a discussion panel, a share button, and a code editor.

15. The device according to claim 11 further comprising an integrated development environment (IDE) controller configured to make changes in a development support component based on the downloaded social information.

16. One or more non-transitory computer-readable media storing processor-executable instructions that when executed cause one or more processors to perform operations that integrates social networks with integrated development environment (IDE) comprising:
    downloading social information based on a user's workspace content, wherein the downloaded social information is loaded into a social message cache;
    filtering and displaying the downloaded social information from the social message cache;
    performing software development using the displayed social information, wherein the performing software development comprises creating a topic related to a source file, wherein the topic comprises an identifier that identifies the source file, a location reference of the source file, one or more user comments and a source file snapshot that includes a read-only copy of the source file; and
    storing updated social information in a database, wherein the updated social information comprises the created topic.

17. The one or more non-transitory computer-readable media according to claim 16, wherein the downloading is implemented through a collaboration support component of a software-based Web Application Toolkit (WATT), wherein the social information is downloaded from a social network.

18. The one or more non-transitory computer-readable media according to claim 17, wherein the collaboration support component is integrated to a development support component to form the software-based Web Application Toolkit.

19. The one or more non-transitory computer-readable media according to claim 16, wherein the performing the software development comprises taking the source file snapshot in response to the topic creation.

20. The one or more non-transitory computer-readable media according to claim 16, wherein the performing the software development comprises marking, with an icon, the source file in a project tree of source files to indicate it has been a subject of discussion.

* * * * *